(12) United States Patent
Chung et al.

(10) Patent No.: US 7,586,876 B2
(45) Date of Patent: Sep. 8, 2009

(54) HANDOFF SYSTEM AND METHOD BETWEEN A WIRELESS LAN AND MOBILE COMMUNICATION NETWORK

(75) Inventors: Eun-Young Chung, Suwon-si (KR); Sang-Do Lee, Suwon-si (KR); Dong-Keon Kong, Suwon-si (KR); Hye-Won Baek, Seongnam-si (KR); Sang-Jun Moon, Yongin-si (KR); Jong-Bum Pyo, Yongin-si (KR); Heung-Chul Jung, Suwon-si (KR); Ji-Cheol Lee, Yongin-si (KR); Sung-Won Lee, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 506 days.

(21) Appl. No.: 11/212,767

(22) Filed: Aug. 29, 2005

(65) Prior Publication Data
US 2006/0045049 A1 Mar. 2, 2006

(30) Foreign Application Priority Data
Aug. 30, 2004 (KR) .................. 10-2004-0068738
Sep. 17, 2004 (KR) .................. 10-2004-0074688

(51) Int. Cl.
*H04W 4/00* (2006.01)
(52) U.S. Cl. .............. 370/331; 370/329; 370/332; 370/333; 370/338; 370/395.3; 455/432.1; 455/436; 455/437; 455/438; 455/439
(58) Field of Classification Search .............. 455/67.11, 455/67.13, 436–444, 432.1; 370/229, 238, 370/238.1, 254, 328, 329, 351, 352, 353, 370/354, 355, 356, 408, 331–333, 338, 395.52, 370/395.3; 709/238, 239, 240, 241, 242, 709/223–230
See application file for complete search history.

(56) References Cited

U.S. PATENT DOCUMENTS

| 6,243,581 | B1 * | 6/2001 | Jawanda ............... 455/432.2 |
| 6,876,640 | B1 * | 4/2005 | Bertrand et al. ............. 370/331 |
| 7,245,917 | B2 * | 7/2007 | Chiueh ................... 455/442 |
| 7,280,505 | B2 * | 10/2007 | Chaskar et al. ............. 370/331 |
| 7,447,182 | B2 * | 11/2008 | Chowdhury et al. ........ 370/338 |
| 2002/0021681 | A1 | 2/2002 | Madour |
| 2002/0046277 | A1 | 4/2002 | Barna et al. |
| 2004/0008645 | A1 * | 1/2004 | Janevski et al. ............. 370/331 |

(Continued)

FOREIGN PATENT DOCUMENTS

WO    WO 03/101044    12/2003

*Primary Examiner*—Charles N Appiah
*Assistant Examiner*—Olumide T Ajibade Akonai
(74) *Attorney, Agent, or Firm*—Roylance, Abrams, Berdo & Goodman, L.L.P.

(57) ABSTRACT

A method for performing a handoff between a wireless local area network (LAN) including an access router (AR) supporting an Internet protocol (IP) routing function and a mobile communication network including a packet data service node (PDSN) connected to a base station system (BSS), for supporting the IP routing function. An access terminal (AT) detects its movement from the wireless LAN to the mobile communication network, and exchanges information for tunneling between the AR and the PDSN, with the PDSN. The PDSN sets up a tunnel for packet delivery between the PDSN and the AR, and delivers packets to the AT through the set tunnel.

19 Claims, 10 Drawing Sheets

U.S. PATENT DOCUMENTS

| | | | |
|---|---|---|---|
| 2004/0085951 A1* | 5/2004 | Rezaiifar et al. | 370/352 |
| 2004/0090958 A1 | 5/2004 | Park et al. | |
| 2004/0132473 A1* | 7/2004 | Mir et al. | 455/517 |
| 2005/0025164 A1* | 2/2005 | Kavanagh et al. | 370/401 |
| 2005/0119001 A1* | 6/2005 | Watanabe | 455/436 |
| 2006/0018280 A1* | 1/2006 | Kumar et al. | 370/331 |
| 2006/0023683 A1* | 2/2006 | Lee et al. | 370/338 |
| 2008/0101291 A1* | 5/2008 | Jiang et al. | 370/331 |

* cited by examiner

HANDOFF SYSTEM AND METHOD BETWEEN A WIRELESS LAN AND MOBILE COMMUNICATION NETWORK

PRIORITY

This application claims the benefit under 35 U.S.C. §119 (a) of an application entitled "Method and System for Transmitting and Maintaining an IP Address of an Access Terminal in a Communication System" filed in the Korean Intellectual Property Office on Aug. 30, 2004 and assigned Serial No. 2004-68738, and an application entitled "Handoff System and Method Between Wireless LAN and Mobile Communication Network" filed in the Korean Intellectual Property Office on Sep. 17, 2004 and assigned Serial No. 2004-74688, the entire contents of both of which are hereby incorporated by reference.

BACKGROUND OF THE INVENTION

1. Field of the Invention

The present invention relates generally to a handoff system and method between a wireless Local Area Network (LAN) and a mobile communication network. In particular, the present invention relates to a system and method for providing a continuous service while an access terminal capable of accessing both a mobile communication network and a wireless LAN performs a handoff between the wireless LAN and the mobile communication network.

2. Description of the Related Art

In general, when a dual-mode access terminal (AT) capable of accessing both a cellular mobile communication network and a wireless local area network (LAN) is allocated an Internet Protocol (IP) address after accessing the wireless LAN and thereafter performs a vertical handoff to the mobile communication network, the AT uses a new IP address allocated from the mobile communication network instead of the existing IP used in the wireless LAN. For example, a Code Division Multiple Access 2000 (CDMA2000) mobile communication system allocates an IP address to an AT using an Internet Protocol Control Protocol (IPCP). The IPCP allocation method and system will now be described with reference to the accompanying drawing.

FIG. 1 is a diagram illustrating a conventional IP packet delivery process where an AT moves from a wireless LAN to a mobile communication network.

In a wireless LAN 40, an IP packet is delivered from an Internet network 30 to an AT 10 via an access router (AR) 42 and an access point (AP) 41 along a bold line 101. The AR 42 performs IP routing and vertical handoff on the AT 10 that accesses the Internet network 30 via the wireless LAN 40. The AR 42, when it supports Mobile IP, can serve as a foreign agent (FA). The AP 41 performs a wireless LAN access protocol with the AT and serves as a bridge between a wireless LAN and a wire network.

When the AT 10 moves from the wireless LAN 40 to a cellular network 20 which is a mobile communication network, an IP address of the AT 10 is updated through a process of FIG. 2, and an IP packet is delivered from a correspondent node (CN) 50 to the AT 10 via the Internet network 30, a packet data service node (PDSN) 22 and a base station system (BSS) 21 along a bold line 102.

A description will now be made of an IP allocation method in the mobile communication network for the foregoing system.

FIG. 2 is a signaling diagram illustrating a conventional IP allocation method in a mobile communication network.

Referring to FIG. 2, an AT 10 performs traffic channel (TCH) setup to a BSS (or 1×BSS) 21 in step 201. Then the BSS 21 performs remote node-PDSN session (R-P session) setup to a PDSN 22 in step 202. The PDSN 22 performs Point-to-Point Protocol (PPP) connection and accounting/authentication on a subscriber that accesses the Internet network 30 via the mobile communication network, and provides a vertical handoff service to the subscriber. Also, the PDSN 22, when it supports Mobile IP, can serve as a foreign agent (FA).

Thereafter, the AT 10 performs Link Control Protocol (LCP) negotiation with the PDSN 22 in step 203, performs Challenge Handshake Authentication (CHAP) authentication with the PDSN 22 in step 204, and performs IPCP negotiation with the PDSN 22 in step 205, thereby allocating an IP address. A format and type of an IPCP message will now be described with reference to Table 1 and Table 2.

A header of the IPCP message, as shown in Table 1, includes an 8-bit Code(1) field, an 8-bit Identifier(1) field, a 16-bit Length(2) field, and a variable-length Data(Variable) field.

TABLE 1

| 1 2 3 4 5 6 7 8 | 9 0 1 2 3 | 4 5 6 7 8 9 0 1 2 3 4 5 6 7 8 9 0 1 2 |
|---|---|---|
| Code(1) | Identifier(1) | Length(2) |
| | Data(Variable) | |

TABLE 2

| Code | Description |
|---|---|
| 0 | Vendor Specific |
| 1 | Configure-Request |
| 2 | Configure-Ack |
| 3 | Configure-Nak |
| 4 | Configure-Reject |
| 5 | Terminate-Request |
| 6 | Terminate-Ack |
| 7 | Code-Reject |

The types of IPCP messages are classified as shown in Table 2 based on the bit value of each code.

In the conventional IP allocation method, the system can neither maintain sessions of upper layers (TCP/UDP layer and application layer) nor receive a packet being delivered to an AT during a vertical handoff process.

The network configuration of FIG. 1 can use Mobile IP to maintain upper layer sessions and provide seamless handoff during a vertical handoff process of the AT 10.

FIG. 3 is a diagram illustrating an IP packet delivery operation where an AT moves from a Mobile IP-based wireless LAN to a mobile communication network.

Referring to FIG. 3, when an AT 10 moves from a wireless LAN 40 to a cellular network 20 which is the mobile communication network, an IP packet is delivered from a CN 50 to the AT 10 via a Mobile IP-based home agent (HA) 60 through an existing IP tunneling route 301 and a new IP tunneling route 302 connected to the mobile communication network.

In the case where Mobile IP is used, the AT 10 can maintain the same IP address even after the vertical handoff, using a home address managed through the HA 60. The HA 60 intercepts a packet being delivered to the AT 10 via the existing IP packet delivery route 301, and delivers (forwards) the intercepted packet to the AT 10 through the new IP tunneling route 302, thereby providing a substantially seamless handoff service. However, in Mobile IP, a time delay may occur due to mobility determination and signaling transmission, and traffic is concentrated in the HA 60 because the HA 60 must intercept the packets being delivered from the CN 50 to the AT 10.

SUMMARY OF THE INVENTION

It is, therefore, an object of the present invention to provide a handoff system and method between a wireless Local Area Network (LAN) and a mobile communication network, for providing a seamless service when an Access Terminal (AT) moves from the wireless LAN to the mobile communication network.

It is another object of the present invention to provide a handoff system and method between a wireless LAN and a mobile communication network, for transmitting/receiving IP packets using the existing IP address when an AT moves from the wireless LAN to the mobile communication network.

It is further anther object of the present invention to provide a handoff system and method capable of reducing a loss of packets while maintaining upper layer sessions when an AT, though it does not use Mobile IP, moves from a wireless LAN to a mobile communication network.

According to one aspect of the present invention, a method is provided for performing a handoff from a wireless local area network (LAN) comprising an access router (AR) supporting an Internet protocol (IP) routing function, to a mobile communication network comprising a packet data service node (PDSN), connected to a base station system (BSS), for supporting the IP routing function. The method comprises the steps of detecting, by an access terminal (AT), its movement from the wireless LAN to the mobile communication network, exchanging, between the AT and the PDSN, information for tunneling between the AR and the PDSN, setting up a tunnel for packet delivery between the PDSN and the AR, and delivering packets to the AT through the set tunnel.

According to another aspect of the present invention, a wireless communication system is provided for performing handoff of an access terminal (AT) that moves from a wireless local area network (LAN) comprising an access router (AR) supporting an Internet protocol (IP) routing function, to a mobile communication network comprising a packet data service node (PDSN), connected to a base station system (BSS), for supporting the IP routing function. The system comprises the AT having a dual-mode function capable of accessing both the wireless LAN and the mobile communication network, for exchanging information for tunneling between the AR and the PDSN with the PDSN, when the AT moves from the wireless LAN to the mobile communication network, and the PDSN for receiving the tunneling information from the AT, setting up a tunnel for packet delivery with the AR according to the received tunneling information, and delivering packets to the AT via the set tunnel.

According to further another aspect of the present invention, a method is provided for performing handoff from a wireless local area network (LAN) comprising an access router (AR) supporting an Internet protocol (IP) routing function, to a mobile communication network comprising a packet data service node (PDSN), connected to a base station system (BSS), for supporting the IP routing function. The method comprises the steps of; exchanging, by the AT, information for temporary tunneling between the PDSN and the AR, with the PDSN, setting up, by the PDSN, a temporary tunnel for packet delivery between the PDSN and the AR, after completion of the handoff, updating, by the PDSN, the temporary tunnel between the PDSN and the AR as a regular tunnel, and delivering, by the PDSN, packets to the AT via the updated regular tunnel.

According to yet another aspect of the present invention, a method is provided for performing handoff by an access terminal (AT) that moves from a wireless local area network (LAN) comprising an access router (AR) supporting an Internet protocol (IP) routing function, to a mobile communication network comprising a packet data service node (PDSN) for supporting the IP routing function. The method comprises the steps of detecting its movement from the wireless LAN to the mobile communication network; exchanging information for tunneling between the PDSN and the AR, with the PDSN, and if a tunnel for packet delivery between the PDSN and the AR is set up, receiving packets via the set tunnel.

According to still another aspect of the present invention, a method is provided for performing handoff by an access terminal (AT) that moves from a wireless local area network (LAN) comprising an access router (AR) supporting an Internet protocol (IP) routing function, to a mobile communication network comprising a packet data service node (PDSN) for supporting the IP routing function. The method comprises the steps of exchanging information for temporary tunneling between the PDSN and the AR, with the PDSN, if a temporary tunnel for packet delivery between the PDSN and the AR is set up, sending a regular tunnel update request to the PDSN after completion of the handoff to the mobile communication network, and if the temporary tunnel for packet delivery between the PDSN and the AR is updated as a regular tunnel, receiving packets via the updated regular tunnel.

According to still another aspect of the present invention, a handoff method is provided between a wireless local area network (LAN) and a mobile communication network performed by a packet data service node (PDSN) in a wireless communication system for performing handoff of an access terminal (AT) that moves from the wireless LAN comprising an access router (AR) supporting an Internet protocol (IP) routing function, to the mobile communication network comprising the PDSN, connected to a base station system (BSS), for supporting the IP routing function. The method comprises the steps of detecting movement of the AT from the wireless LAN to the mobile communication network, exchanging information for tunneling from the PDSN and the AR, with the AT, setting up a tunnel for packet delivery with the AR, and delivering received packets to the AT via the set tunnel.

According to still another aspect of the present invention, a handoff method is provided between a wireless local area network (LAN) and a mobile communication network performed by a packet data service node (PDSN) in a wireless communication system for performing handoff of an access terminal (AT) that moves from the wireless LAN comprising an access router (AR) supporting an Internet protocol (IP) routing function, to the mobile communication network comprising the PDSN for supporting the IP routing function. The method comprises the steps of exchanging information for temporary tunneling between the PDSN and the AR with the AT, and setting up a temporary tunnel for packet delivery with the AR according to the temporary tunneling information, after completion of the handoff, updating the temporary tunnel between the PDSN and the AR as a regular tunnel, and delivering packets to the AT via the updated regular tunnel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Figure 1:
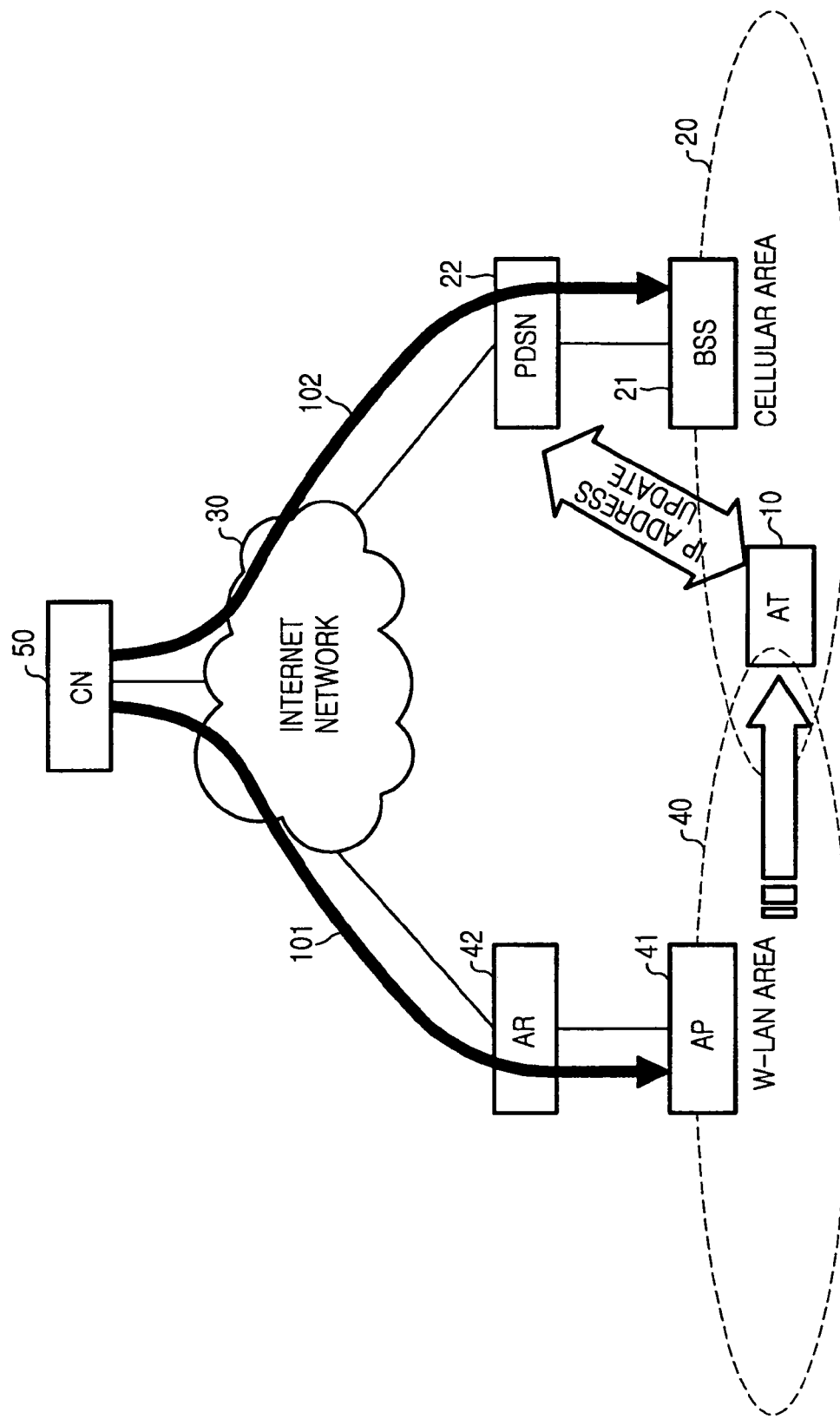
FIG. 1 is a diagram illustrating a conventional Internet Protocol (IP) packet delivery process where an Access Terminal (AT) moves from a wireless Local Area Network (LAN) to a mobile communication network.
Figure 2:
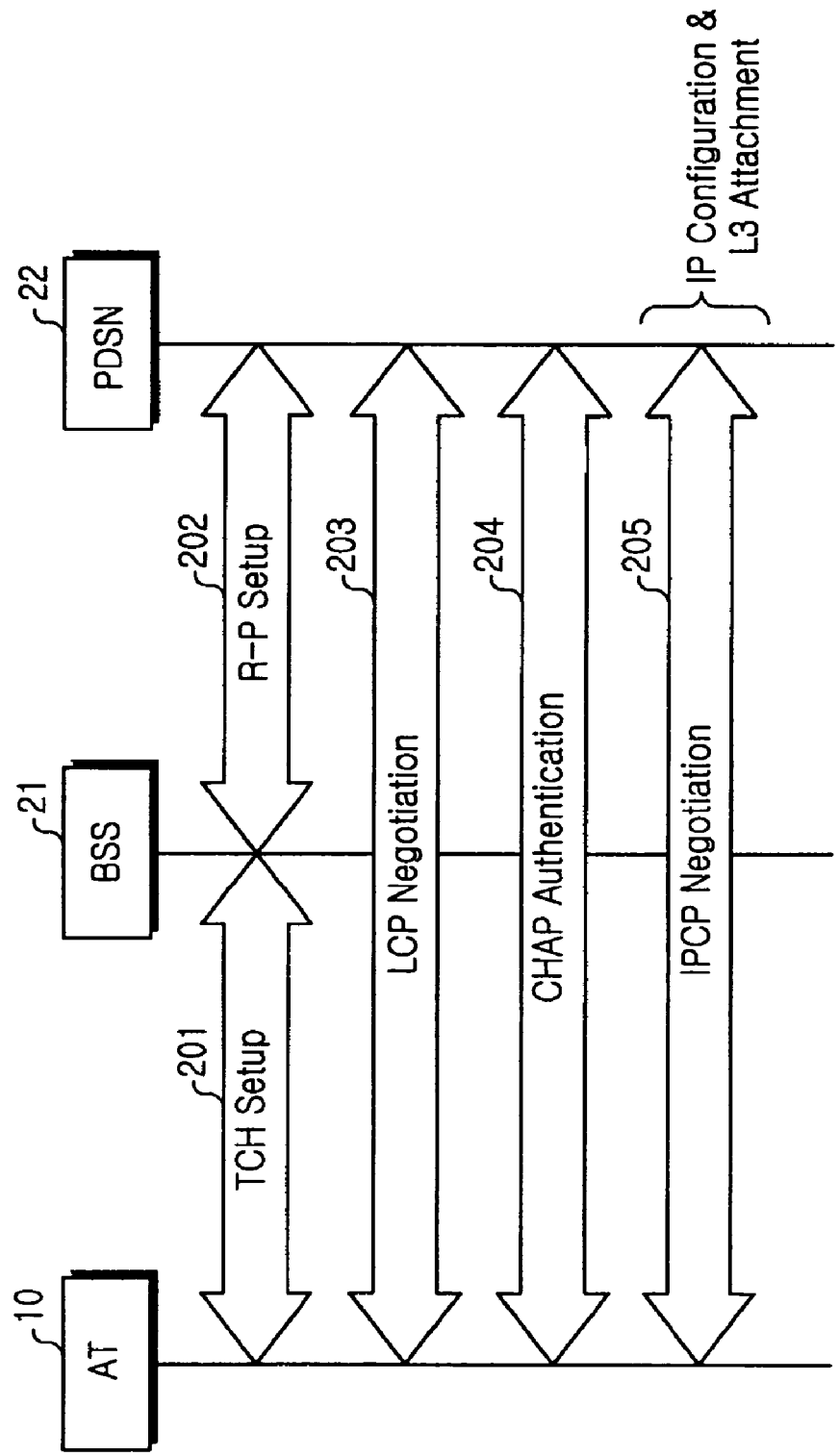
FIG. 2 is a signaling diagram illustrating a conventional IP allocation method in a mobile communication network.
Figure 3:
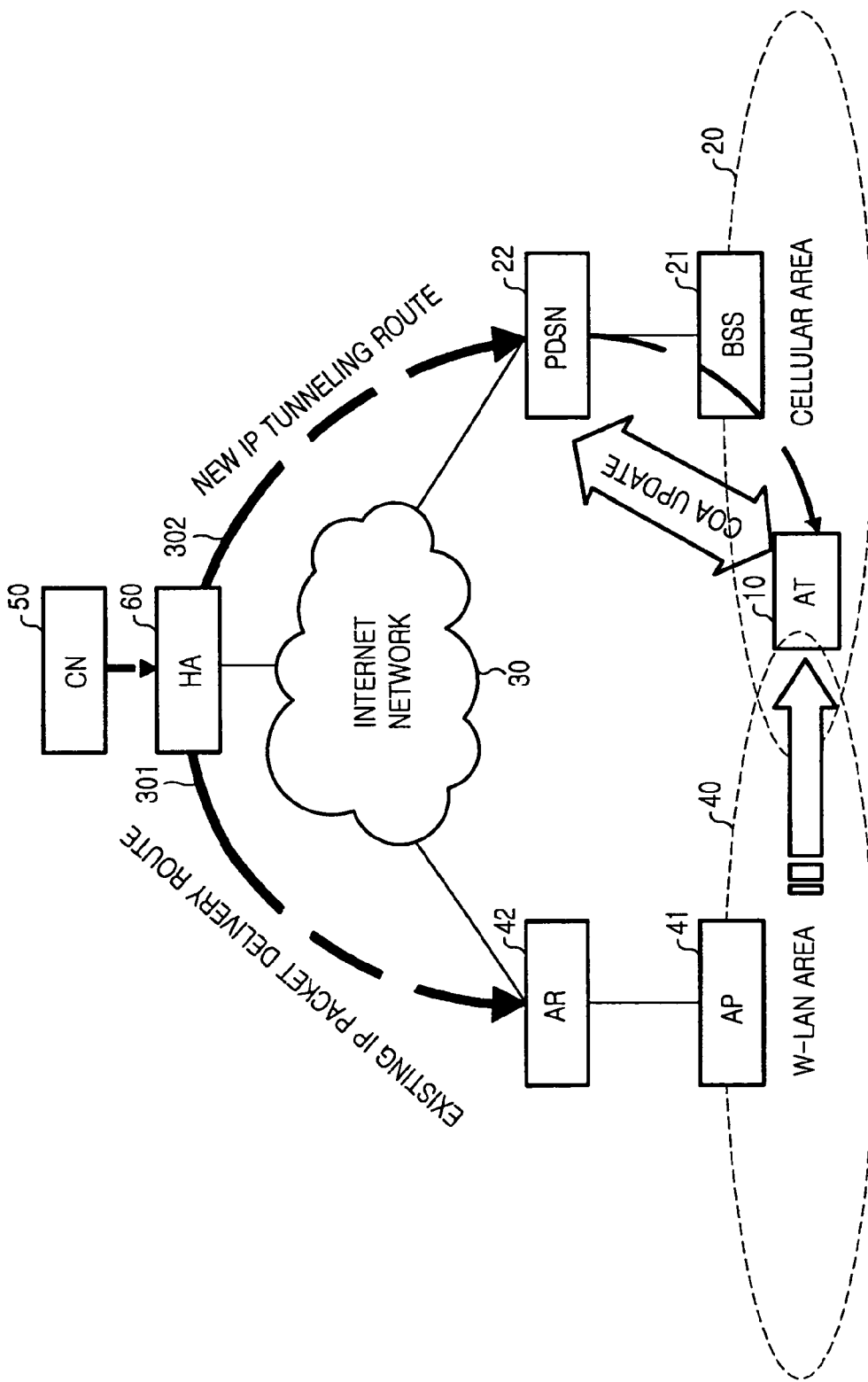
FIG. 3 is a diagram illustrating a conventional IP packet delivery process where an AT moves from a Mobile IP-based wireless LAN to a mobile communication network.

Several preferred embodiments of the present invention will now be described in detail with reference to the accompanying drawings. In the drawings, the same or similar elements are denoted by the same reference numerals even though they are depicted in different drawings. In the following description, a detailed description of known functions and configurations incorporated herein has been omitted for conciseness.

Figure 4:
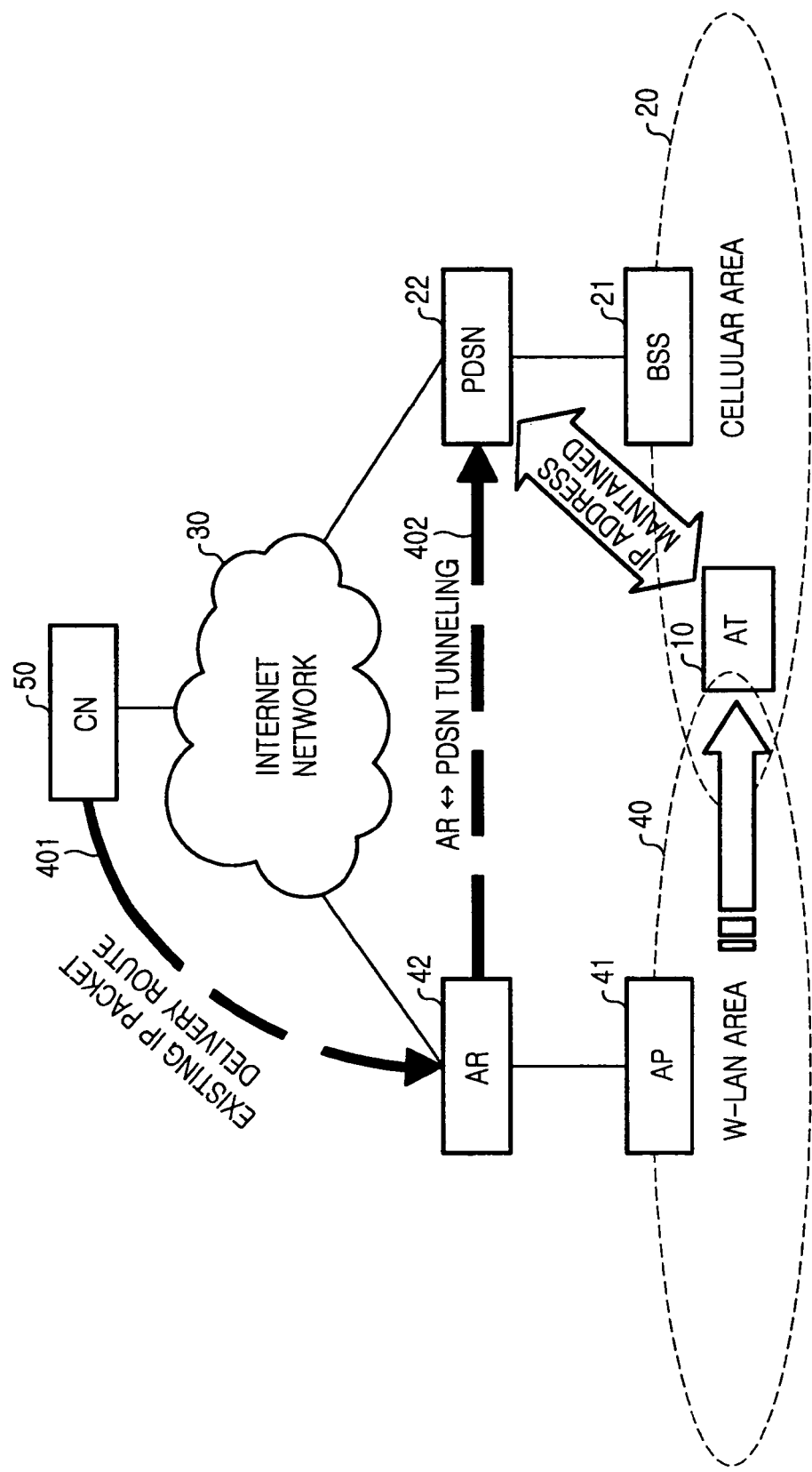
FIG. 4 is a diagram illustrating an IP packet delivery process where an AT moves from a wireless LAN to a mobile communication network according to an embodiment of the present invention.

The present invention provides a method for maintaining an intact Internet Protocol (IP) address of an Access Terminal (AT) when the AT supporting one or more wireless access techniques moves from a wireless LAN to a mobile communication network, thereby maintaining upper layer sessions and seamlessly delivering IP packets being delivered to the wireless LAN to an AT located in the mobile communication network. The embodiments of the present invention can use a Code Division Multiple Access (CDMA) 2000 1x system as the mobile communication network, and an 802.11x-based WiFi technology as a wireless LAN. However, it should be noted that a network configuration of FIG. 4 is an exemplary embodiment of the present invention, and the embodiments of the present invention can be applied to various networks such as a cellular mobile communication network and an IEEE 801.1x or 802.2x-based wireless LAN.

The embodiments of the present invention provide the following methods so that an AT, after moving from a wireless LAN to a mobile communication network, can transmit and receive IP packets using an exiting IP address.

First, an embodiment of the present invention provides a method for informing a PDSN of an IP address used by the AT in the wireless LAN and an IP address of an Access Router (AR), to form a tunneling route for IP packet delivery between the PDSN and the AR.

Second, an embodiment of the present invention provides an IP packet delivery method for a message flow between the AT, the AR and the PDSN, for setting the tunneling path, and the IP packet delivery method for a tunneling route between the PDSN and the AR.

Third, an embodiment of the present invention provides a method for releasing the tunneling route that was set between the AR and the PDSN while the AT performs a handoff from the wireless LAN to the mobile communication network.

FIG. 4 illustrates a network configuration in which an AT transmits and receives IP packets using an existing IP address even after moving from a wireless LAN to a mobile communication network according to an embodiment of the present invention.

Referring to FIG. 4, an AT 10 with a dual-mode function can be connected to an Internet network or IP network 30 via a BSS 21 and a PDSN 22 of a mobile communication network 20, or can be connected to the Internet network 30 via an AP 41 and an AR 42 of a wireless LAN 40.

To the Internet network 30 is connected a correspondent node (CN) 50 that performs data communication or provides a service to a user. A Home Agent (HA) (not shown) for supporting Mobile IP is connected between the Internet network 30 and the CN or server 50.

The BSS 21 processes a wireless access protocol with an AT that accesses a cellular network.

The PDSN 22 provides an accounting/authentication function, an IP routing function, and a vertical handoff function to ATs and users that access the Internet network 30 via the mobile communication network.

The AP 41 processes a wireless LAN access protocol with an AT that accesses the wireless LAN, and serves as a bridge between the wireless LAN and a wire LAN.

The AR 42 provides an accounting/authentication function, an IP routing function, and a vertical handoff function to ATs and users that access the Internet network 30 via the wireless LAN, and when supporting Mobile IP, serves as a foreign agent (FA) of another network.

The CN 50, connected to the AT 10 via the Internet network 30, performs data communication with the AT 10 or provides a service to a user.

With reference to FIG. 4, a detailed description will now be made of a process of delivering IP packets to an AT that has moved from a wireless LAN to a mobile communication network in the foregoing network configuration.

Referring to FIG. 4, according to an embodiment of the present invention, when the AT 10 that was receiving IP packets from the CN 50 after accessing the wireless LAN, has moved to the mobile communication network, it maintains the intact existing IP address. That is, as illustrated, if the AR 42 receives IP packets through an existing IP packet delivery route 401, the AT 10 continuously receives IP packets being delivered from the CN 50 via a tunneling route 402 between the AR 42 of the wireless LAN 40 and the PDSN 22 of the cellular network 20.

On the contrary, when the AT 10 transmits IP packets to the CN 50, the IP packets are delivered up to the CN 50 by the routing function of the PDSN 22, or the IP packets are delivered through the tunneling route 402 from the PDSN 22 of the cellular network 20 to the AR 42 of the wireless LAN 40. In this case, the tunneling route 402 serves as a reverse tunnel. The IP packets are delivered up to the CN 50 by the routing function of the AR 42.

With reference to the accompanying drawing, a description will now be made of protocol stacks between the AT 10, the BSS 21, the PDSN 22, and the AR 42 while the AT 10 moves from the wireless LAN to the mobile communication network.

Figure 5:
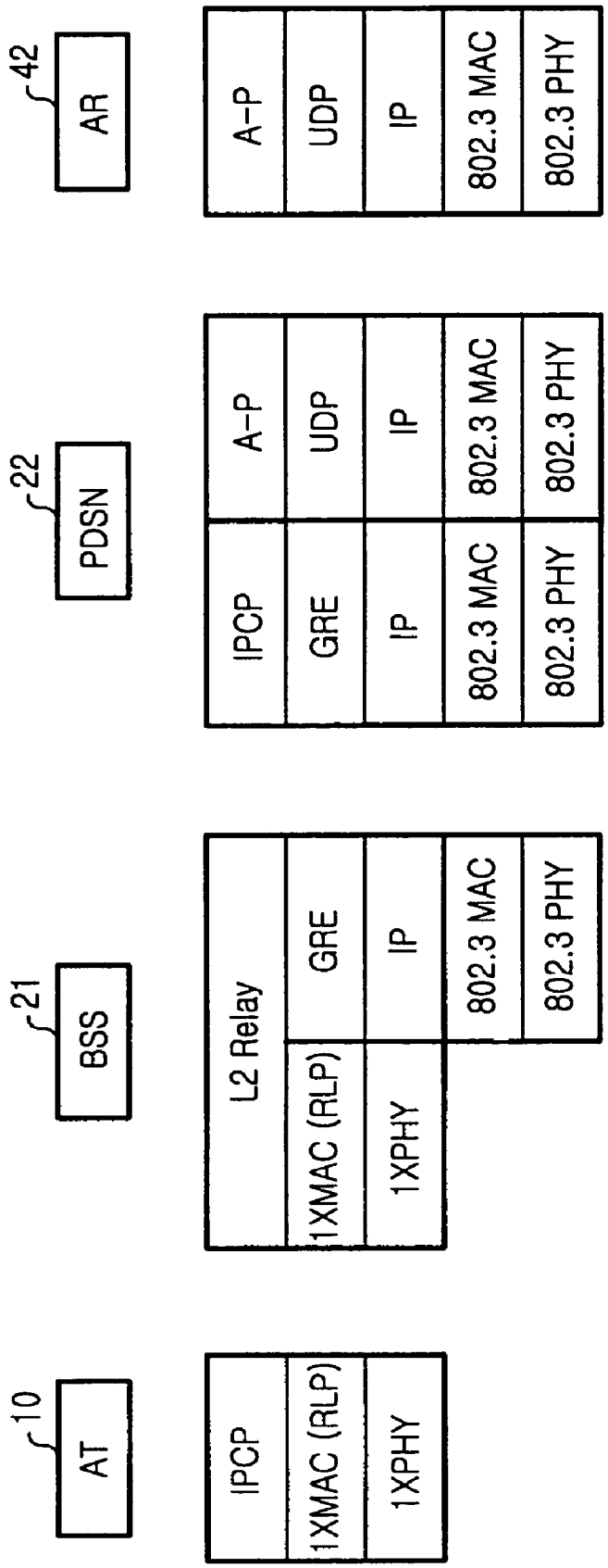
FIG. 5 is a diagram illustrating protocol stacks for a vertical handoff process from a wireless LAN to a mobile communication network according to an embodiment of the present invention.

FIG. 5 is a diagram illustrating protocol stacks for a vertical handoff process from a wireless LAN to a mobile communication network according to an embodiment of the present invention.

Referring to FIG. 5, an AT 10 comprises an IPCP layer, a 1×MAC(RLP) layer, and a 1×PHY layer in descending order. A BSS 21 comprises an L2 Relay layer, a 1×MAC(RLP) layer, and a 1×PHY layer in descending order for the AT 10, and the BSS 21 comprises an L2 Relay layer, a Generic Routing Encapsulation (GRE) layer, an IP layer, an 802.3 MAC layer, and an 802.3 PHY layer in descending order. The PDSN 22 comprises an IPCP layer, a GRE layer, an IP layer, an 802.3 MAC layer, and an 802.3 PHY layer, an A-P (AR-PDSN) layer, a UDP layer, an IP layer, an 802.3 MAC layer, and an 802.3 PHY layer in descending order. The AR 42 comprises an A-P layer, a UDP layer, an IP layer, an 802.3 MAC layer, and an 802.3 PHY layer in descending order.

In the protocol stacks, the A-P layer manages transmission/reception of messages used for setting or releasing a tunnel between the PDSN 22 and the AR 42. It can be noted from the protocol stacks of FIG. 5 that the AT 10 delivers the existing IP address used in a wireless LAN and the tunneling-related information to the PDSN 22 using the IPCP layer during handoff from the wireless LAN to the mobile communication network.

With reference to the accompanying drawing, a detailed description will now be made of an IP packet delivery method where the AT moves from the wireless LAN to the mobile communication network in the foregoing network configuration.

For a vertical handoff operation, it is necessary to inform the PDSN 22 of an existing IP address of the AT 10 that accessed the mobile communication network, and an IP address of the AR 42. Thus, a description will now be made of an operation performed when the AT 10 moves to the mobile communication network while exchanging IP packets with the CN 50 after accessing the wireless LAN.

Figure 6:
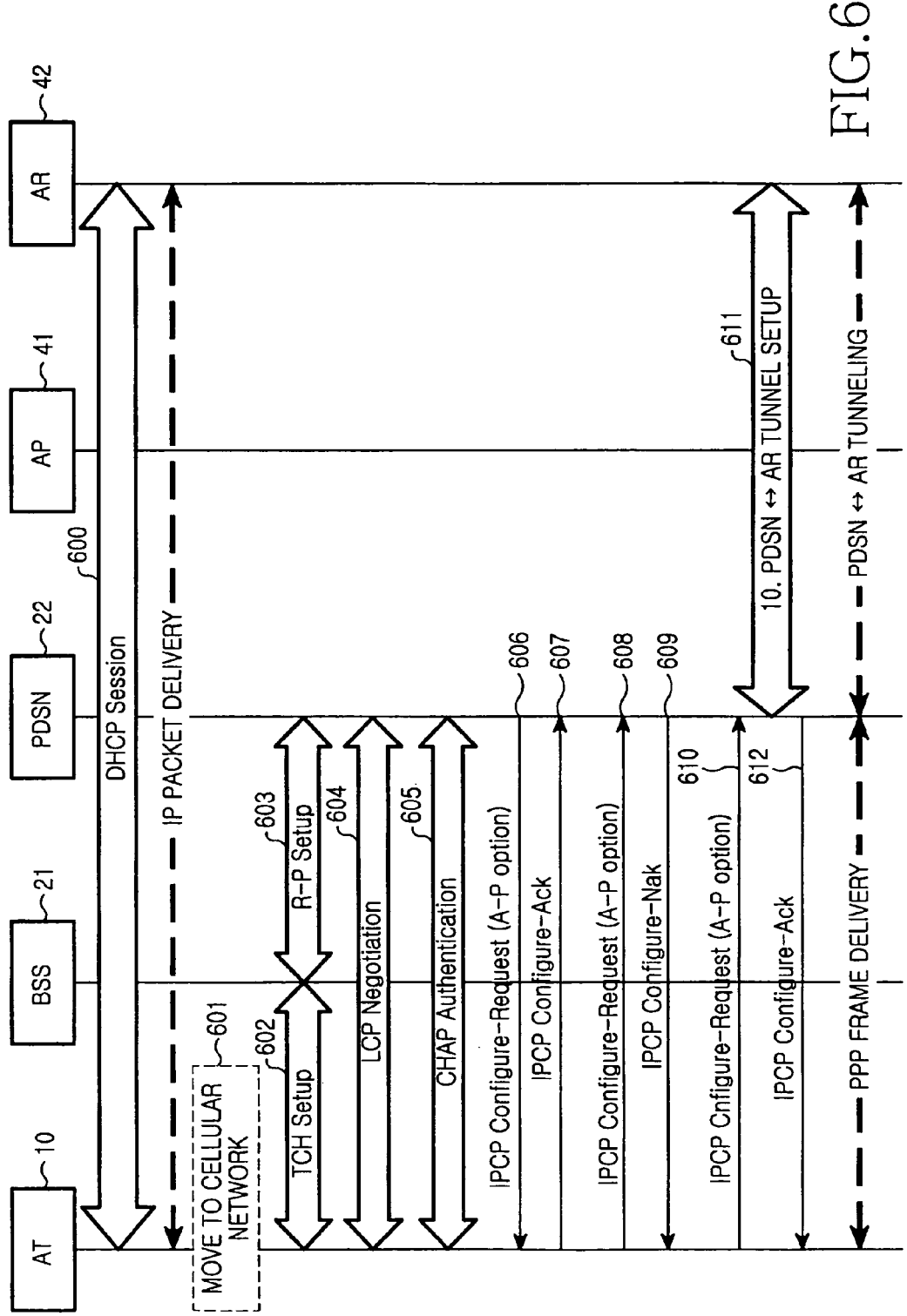
FIG. 6 is a signaling diagram illustrating an IP packet delivery operation where an AT moves from a wireless LAN to a mobile communication system according to an embodiment of the present invention.

FIG. 6 is a signaling diagram illustrating an IP packet delivery operation where an AT moves from a wireless LAN to a mobile communication system according to an embodiment of the present invention.

Referring to FIG. 6, in step 600, an AT 10 establishes a Dynamic Host Configuration Protocol (DHCP) session to an AR 42 and exchanges IP packets with a CN 50 via the AR 42. In this process, the AT 10 moves from a wireless LAN to a mobile communication network in step 601. Upon detecting the movement from the wireless LAN to the mobile communication network, the AT 10 sets up a traffic channel (TCH) to a BSS 21 in step 602, and the BSS 21 sets up an R-P session to a PDSN 22 in step 603.

Thereafter, for a PPP session, the AT 10 performs LCP negotiation with the PDSN 22 in step 604, and performs CHAP authentication with the PDSN 22 in step 605.

In step 606, the PDSN 22 transmits an IPCP Configure-Request message with an 'A-P parameter option' shown in Table 3 to the AT 10 in order to inform the AT 10 of its own IP address and an IP address of an interface used for an A-P tunnel.

TABLE 3

| Field Name | Length (bytes) | Description |
| --- | --- | --- |
| Type | 1 | Specific variable |
| Len | 1 | 8 |
| serving PDSN IP | 4 | IP address of PDSN |
| tunnel if | 4 | IP address of PDSN that is used for AR ↔ PDSN tunneling |

The 'A-P parameter option' comprises a 1-byte 'type' field, a 1-byte 'len' (length) field, a 4-byte 'serving PDSN IP' field indicating an IP address of the PDSN 22, and a 4-byte 'tunnel if' field indicating an IP address of the PDSN 22, used for tunneling between the AR 42 and the PDSN 22. The PDSN 22 informs the AT 10 of a service node's IP address used for tunneling between the PDSN 22 and the AR 42, using the 'tunnel if' field in the 'A-P parameter option'. Herein, the serving node refers to a node that becomes an anchor node during handoff. For example, when the AT 10 moves from the wireless LAN to the mobile communication network, the AR 42 serves as a serving node. However, when the AT 10 moves from the mobile communication network to the wireless LAN, the PDSN 22 serves as a serving node.

Thereafter, in step 607, the AT 10, upon successfully receiving the IPCP Configure-Request message, transmits an IPCP Configure-Ack message to the PDSN 22 in response to the IPCP Configure-Request message.

In step 608, the AT 10 that has moved from the wireless LAN to the mobile communication network sets the existing IP address as its IP address, using an 'IP-address option' in an IPCP Configure Option message.

The IPCP Configure Option message, as illustrated in Table 4, comprises an 8-bit Type(1) field, an 8-bit Length(1) field, and a variable-length Data(Variable) field. Types of the IPCP Configure Option messages can be classified as shown in Table 5 according to an option value of the 8-bit Type(1) field.

TABLE 4

| 1 2 3 4 5 6 7 8 | 9 0 1 2 3 4 5 6 | 7 8 9 0 1 2 3 4 5 6 7 8 9 0 1 2 |
| --- | --- | --- |
| Type(1) | Length(1) | Data(Variable) |
| | Data(Variable) | |

TABLE 5

| Option | Length (bytes) | Description |
|---|---|---|
| 1 | | IP-Addresses, Deprecated |
| 2 | >=14 | IP-Compression-Protocol |
| 3 | 6 | IP-Address |
| 4 | 6 | Mobile-IPv4 |
| 129 | 6 | Primary DNS Server Address |
| 130 | 6 | Primary NBNS Server Address |
| 131 | 6 | Secondary DNS Server Address |
| 132 | 6 | Secondary NBNS Server Address |

Further, in step 608, the AT 10 sets an 'A-P tunnel request option' shown in Table 6 to provide the PDSN 22 with setup information comprising an IP address of the AR 42 that it has previously accessed. To send a request for handoff-related requirements of the AT 10 to the PDSN 22, the AT 10 can further comprise an 'A-P rev tunneling option' shown in Table 8 or an 'A-P packet buffering option' shown in Table 7 as an IPCP configuration option.

The 'A-P tunnel request option', as shown in Table 6, comprises a 1-byte 'type' field, a 1-byte 'len' field, a 4-byte 'anchor IP' field indicating an IP address of the AR 42, required for tunneling from the AR 42 to the PDSN 22, and a 1-byte 'tunnel protocol' field, and the details thereof are shown in Table 6.

TABLE 6

| Field Name | Length (bytes) | Description |
|---|---|---|
| type | 1 | specific variable |
| len | 1 | 5 |
| anchor IP | 4 | IP address of AR that is used for AR ↔PDSN tunneling |
| tunnel protocol | 1 | Tunnel protocol request<br>47 (for GRE tunneling)<br>94 (for IP within IP tunneling)<br>17 (for UDP tunneling)<br>6 (for TCP tunneling) |

The 'A-P packet buffering option' comprises a 1-byte 'type' field, a 1-byte 'len' field, and a 1-byte 'buf' field, as illustrated in Table 7.

TABLE 7

| Field Name | Length (bytes) | Description |
|---|---|---|
| type | 1 | Specific variable |
| len | 1 | 1 |
| buf | 1 | Request IP Buffering |

The 'A-P rev tunneling option' comprises a 1-byte 'type' field, a 1-byte 'len' field, and a 1-byte 'rev tunneling' field, as shown in Table 8.

TABLE 8

| Field Name | Length (bytes) | Description |
|---|---|---|
| type | 1 | Specific variable |
| len | 1 | 1 |
| rev tunneling | 1 | Request Reverse Tunneling |

Referring back to FIG. 6, if the PDSN 22 does not accept any one of A-P options in the IPCP Configure-Request message, the AT 10 transmits an IPCP Configure-Nak message with only the unaccepted option in step 609. In this case, the IPCP Configure-Nak message does not have the option accepted by the PDSN 22.

In step 610, the AT 10 removes or modifies the A-P options included in the IPCP Configure-Nak message, and retransmits the IPCP Configure-Request message. In response, if the PDSN 22 accepts the A-P option included in the IPCP Configure-Request message, it creates a tunnel between the PDSN 22 and the AR 42 in step 611.

If the PDSN 22 succeeds in creating a tunnel to the AR 42, the PDSN 22 transmits an IPCP Configure-Ack message in response to the IPCP Configure-Request message in step 612. However, upon failure in tunnel creation, the PDSN 22 transmits an IPCP Configure-Nak message to the AT 10, and then performs a general IPCP configuration process.

Figure 7:
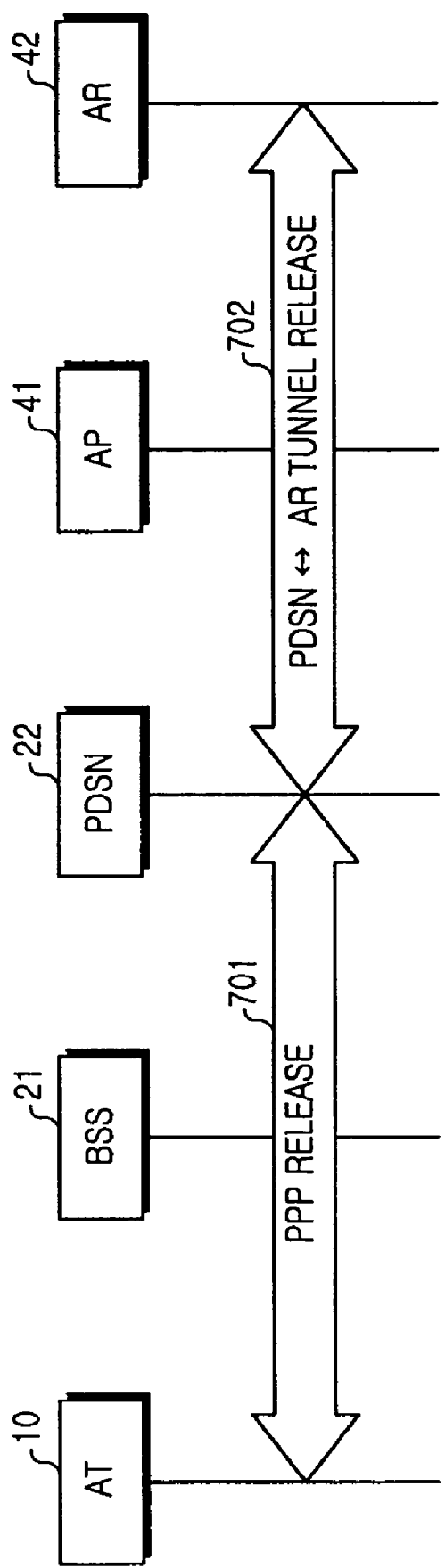
FIG. 7 is a signaling diagram illustrating a tunnel release method between a Packet Data Service Node (PDSN) and an Access Router (AR) according to an embodiment of the present invention.

After the tunnel is created between the PDSN 22 and the AR 42 in this manner, the tunnel is released if the AT 10 no longer exchanges IP packets or is powered off. The tunnel release process will now be described with reference to FIG. 7.

In step 701, the AT 10 performs a PPP release process with the PDSN 22. In response, the PDSN 22 releases the tunnel to the AR 42 in step 702.

A description will now be made of another method provided by an embodiment of the present invention such that an AT that has moved from the wireless LAN to the mobile communication network can transmit and receive IP packets using the existing IP address according to the embodiment of the present invention.

First, upon detecting its destination to the mobile communication network before the AT 10 leaves the wireless LAN to the mobile communication network, the AT 10 preaccesses the mobile communication network and sets up a temporary tunnel between the PDSN 22 and the AR 42.

Second, upon completion of the handoff from the wireless LAN to the mobile communication network, the AT 10 transmits a Handoff (HO) Complete message to the PDSN 22.

Third, upon receiving the Handoff Complete message, the PDSN 22 updates a regular tunnel to the AR 42.

It is assumed herein that an AT can detect a mobile communication network before it fully moves from a wireless LAN to the mobile communication network and the AT defines the time when it enters the mobile communication network as a handoff complete time. Shown in FIG. 8 is another method provided by an embodiment of the present invention such that an AT, after moving from a wireless LAN to a mobile communication network, can receive a seamless service using an existing IP address.

Figure 8:
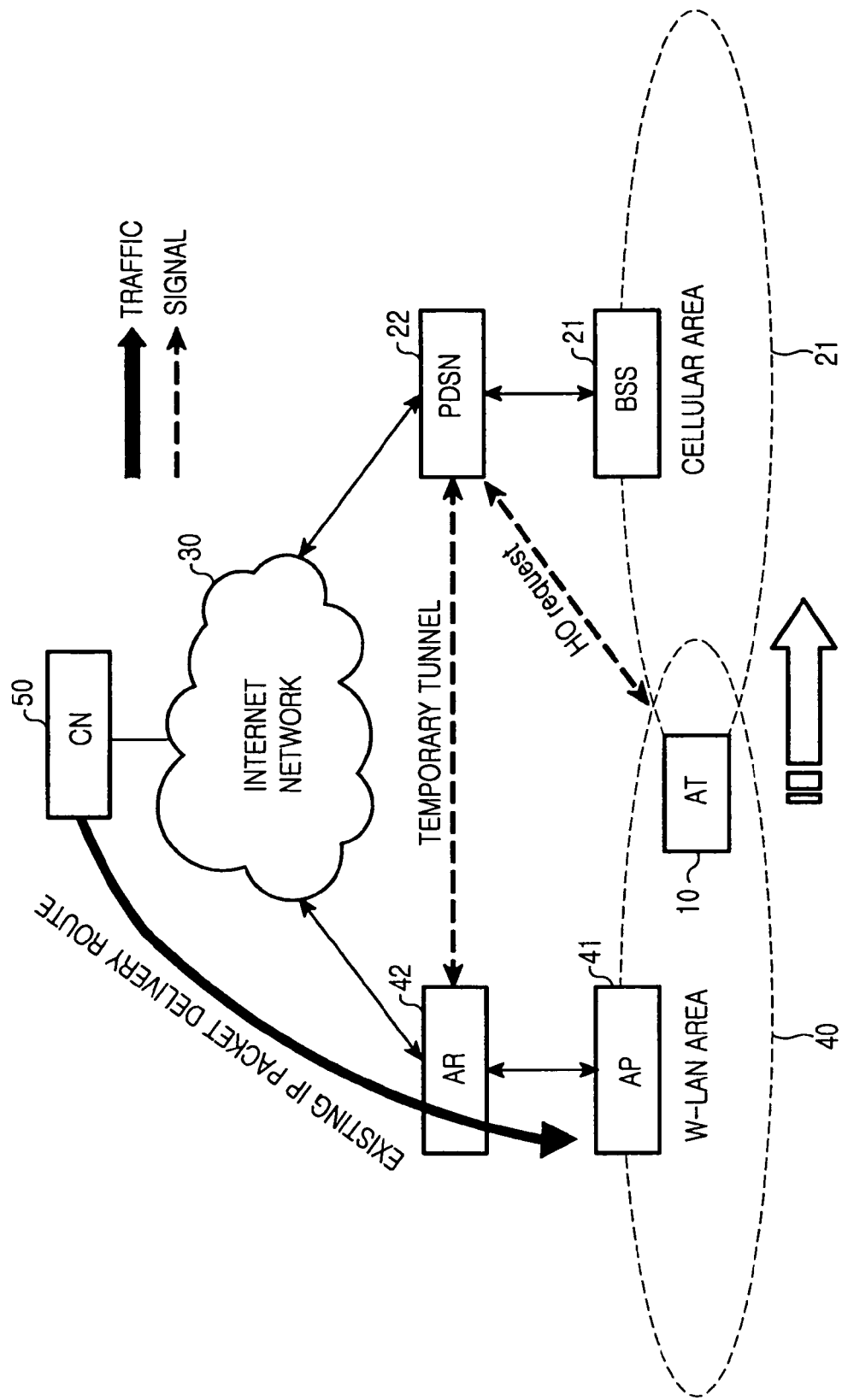
FIG. 8 is a diagram illustrating an IP packet delivery route before handoff between a wireless LAN and a mobile communication network according to another embodiment of the present invention.

Referring to FIG. 8, before an AT 10 that was exchanging IP packets with a CN 50 that accessed a mobile communication network and was performing data communication therewith, fully moves to a cellular network 20 of the mobile communication network, the AT 10 detects a decrease in strength of a signal from an AP 41 and an increase in strength of a signal from a BSS 21. In order to allow the AT 10 to maintain an existing IP address used in a wireless LAN before handoff to the mobile communication network, a PDSN 22 of the mobile communication network previously sets up a temporary tunnel to an AR 42. The temporary tunnel is defined as an interface between the PDSN 22 and the AR 42. Once the temporary tunnel is set up, the AR 42 receives IP packets from the CN 50, and delivers the IP packets to the AT 10 through the temporary tunnel between the PDSN 22 and the AR 42, i.e., a downlink data route. On the contrary, the PDSN 22 receives IP packets from the AT 10, and delivers the IP packets to the AR 42 through the temporary tunnel between the PDSN 22 and the AR 42, i.e., an uplink data route. Then the IP packets are delivered to the CN 50 by a routing function of the AR 42.

Figure 9:
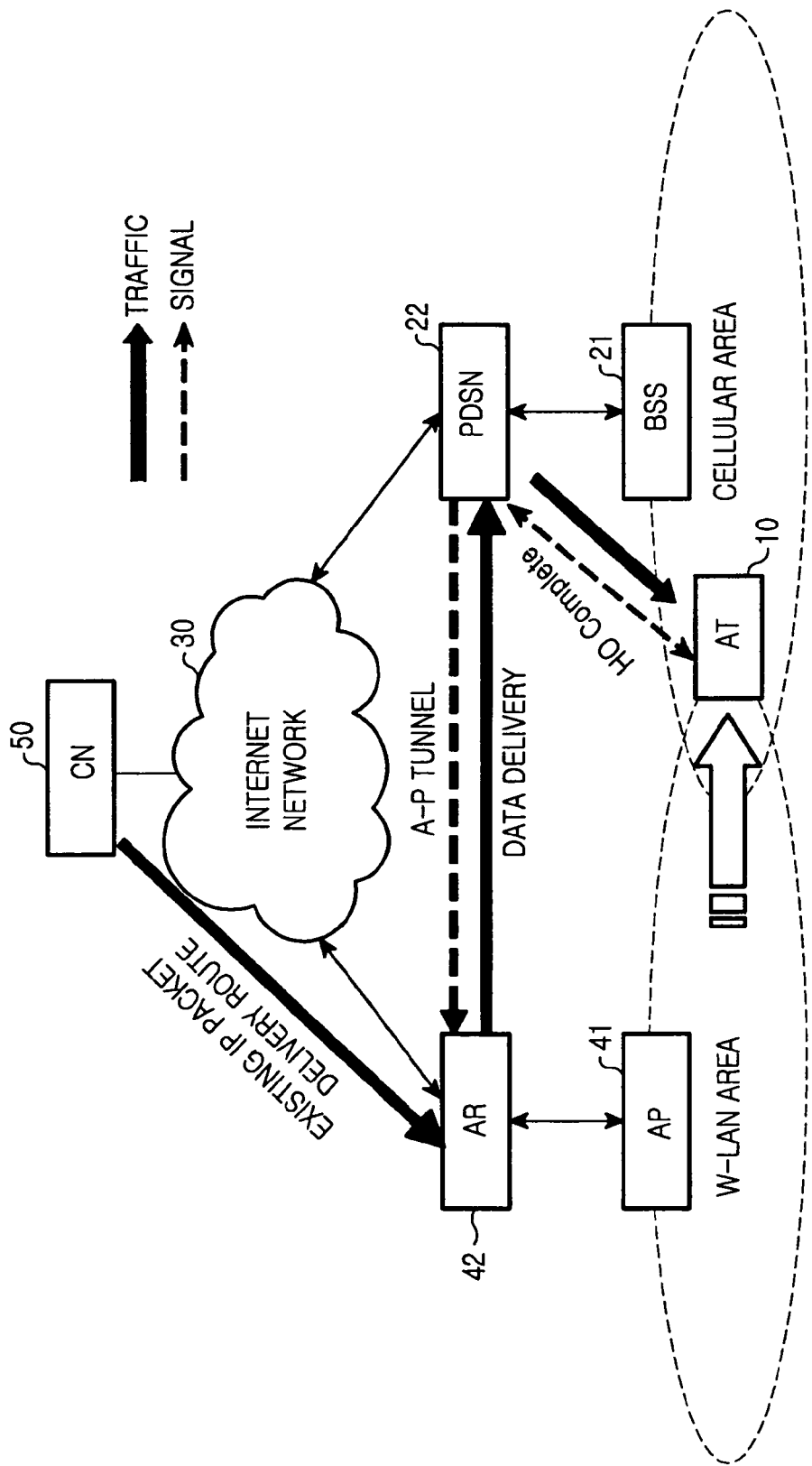
FIG. 9 is a diagram illustrating an IP packet delivery route after handoff between a wireless LAN and a mobile communication network according to another embodiment of the present invention.

With reference to FIG. 9, a description will now be made of the second and third methods provided by embodiments of the present invention such that an AT that has moved from a wireless LAN to a mobile communication network can transmit and receive IP packets using an existing IP address.

An AT 10 transmits an IPCP Configure-Request message with an 'A-P tunnel request option' to a PDSN 22 to inform the PDSN 22 of completion of a handoff. In this case, the AT 10 sets a 'Temporary Tunneling Request (TTR)' flag in the 'A-P tunnel request option' to '0' in order to update a tunnel from the PDSN 22 to an AR 42. A detailed description of the 'A-P tunnel request option' will be made with reference to FIG. 10.

Then the PDSN 22 updates a regular tunnel to the AR 42. Thereafter, the AR 42 begins delivering IP packets through the mobile communication network using the tunnel, instead of delivering the IP packets via the wireless LAN.

Figure 10:
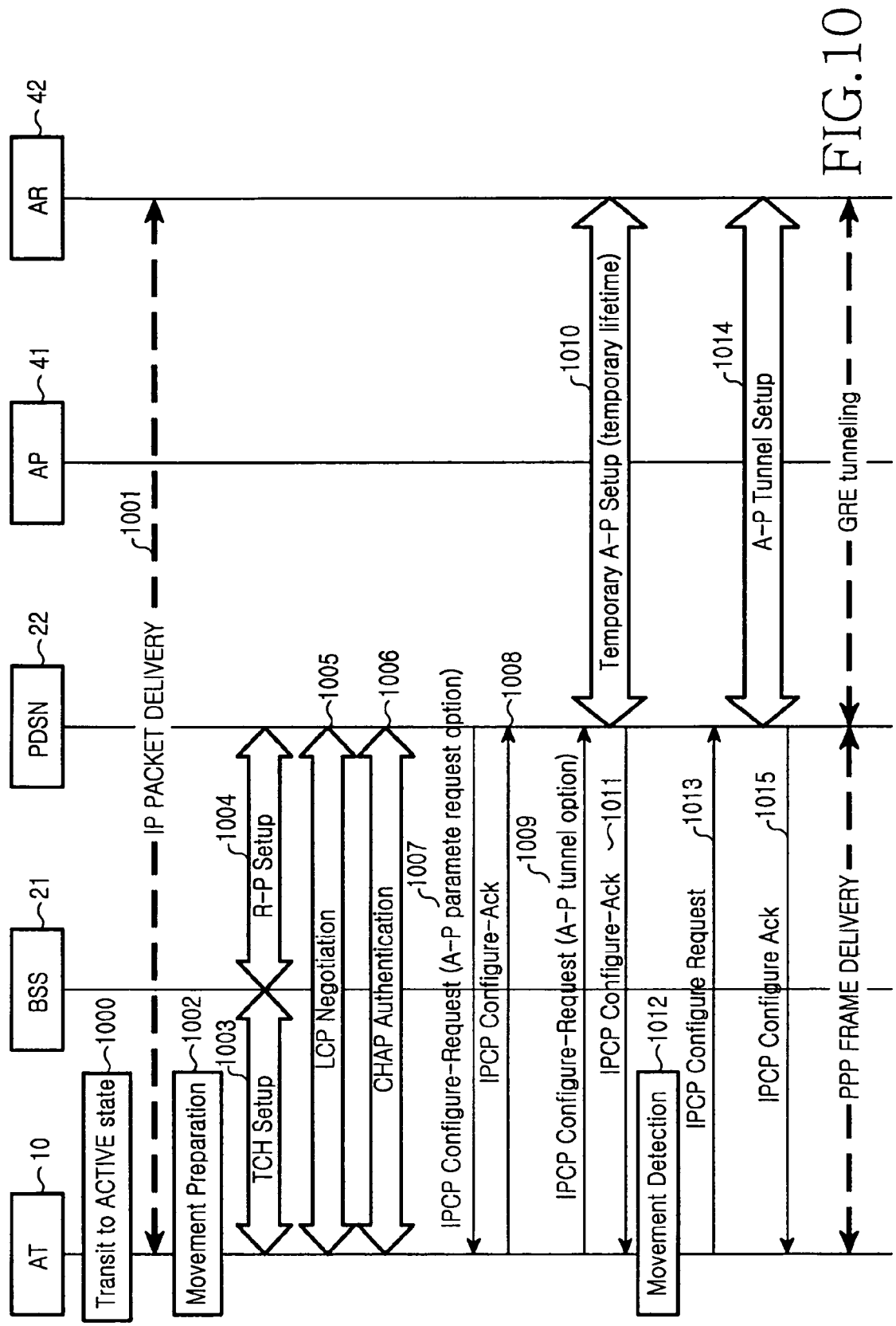
FIG. 10 is a signaling diagram illustrating a handoff method between a wireless LAN and a mobile communication network according to another embodiment of the present invention.

With reference to FIG. 10, a description will now be made of an operation performed such that an AT that has moved from a wireless LAN to a mobile communication network can transmit and receive IP packets using an existing IP address according to an embodiment of the present invention.

In step 1000, an AT 10 located in a wireless LAN 40 makes a transition to an Active state. If a DHCP session to an AR 42 is formed, the AT 10 exchanges IP packets with the AR 42 in step 1001. During the process, the AT 10 prepares for movement from the wireless LAN to the mobile communication network in step 1002. The AT 10 prepares for the movement from the wireless LAN to the mobile communication network, if strength of a signal from an AP 41 of the wireless LAN 40 becomes less than a predetermined threshold and strength of a signal from a BSS 21 of a cellular network 20, or the mobile communication network, becomes greater than a predetermined threshold. In step 1003, the AT 10 creates a traffic channel to the BSS 21. In step 1004, the BSS 21 performs R-P session setup to a PDSN 22.

For a PPP session, the AT 10 performs LCP negotiation with the PDSN 22 in step 1005, and performs CHAP authentication with the PDSN 22 in step 1006.

In step 1007, the PDSN 22 transmits an IPCP Configure-Request message with an 'A-P parameter option' shown in Table 9 to the AT 10 in order to inform the AT 10 of its own IP address and an IP address of an interface used for an A-P tunnel. Thereafter, upon successfully receiving the IPCP Configure-Request message, the AT 10 transmits an IPCP Configure-Ack message to the PDSN 22 in response to the IPCP Configure-Request message in step 1008. The 'A-P parameter option', as shown in Table 9, comprises a 1-byte 'type' field, a 1-byte 'len' field, a 4-byte 'serving PDSN IP' field indicating an IP address of the serving PDSN 22, a 4-byte 'tunnel if' field indicating an IP address of a PDSN used for tunneling between the AR 42 and the PDSN 22, and a 1-byte 'tunnel protocol' field indicating a tunnel protocol supported by the PDSN 22. The AT 10 can perform a handoff if a tunneling protocol supported in the PDSN 22 in the 'A-P parameter option' is identical to a tunneling protocol supported in the wireless LAN.

TABLE 9

| Field Name | Length (bytes) | Description |
|---|---|---|
| type | 1 | Specific value |
| length | 1 | 9 |
| serving PDSN IP | 4 | IP address of PDSN |
| tunnel if | 4 | IP address of PDSN that is used for AR ↔ PDSN tunneling |
| tunnel protocol | 1 | Supported Tunneling Protocol in PDSN 47 (for GRE tunneling) 94 (for IP within IP tunneling) 17 (for UDP tunneling) 6 (for TCP tunneling) |

In step 1009, the AT 10, after moving from the wireless LAN to the mobile communication network, sets the existing IP address as its IP address using an 'IP-Address option' in the IPCP Configure Option message shown in Table 4 and Table 5.

Further, in step 1009, the AT 10 transmits an IPCP Configure-Request message with an 'A-P tunnel request option' shown in Table 10 to the PDSN 22 in order to provide the PDSN 22 with setting information requested by the AT 10 and an IP address of the AR 42 that the AT 10 has previously accessed. In this case, the AT 10 sets a TTR flag in the 'A-P tunnel request option' of Table 10 to '1' in order to request a temporary tunnel from the PDSN 22 t the AR 42.

The 'A-P tunnel request option', as shown in Table 10, comprises a 1-byte 'type' field, a 1-byte 'len' field, a 4-type 'anchor IP' field indicating an IP address of the AR 42 used for tunneling from the AR 42 to the PDSN 22, and a 1-byte 'TTR' field. Among them, the 'anchor IP' field is used for informing the PDSN 22 of an IP address of the AR 42 in the wireless LAN, currently being accessed by the AT 10.

The AT 10 sets the TTR flag in the 'A-P tunnel request option' to '1' in order to request temporary tunneling, and sets the TTR flag in the 'A-P tunnel request option' to '0' in order to request update of regular tunneling.

TABLE 10

| Field Name | Length (bytes) | Description |
|---|---|---|
| type | 1 | Specific value |
| len | 1 | 6 |
| anchor IP | 4 | IP address of AR that is used for AR ↔ PDSN tunneling |
| TTR | 1 | Temporary Tunneling Request '1' Temporary Tunnel Request '0' Regular Tunnel Request |
| tunnel protocol | 1 | Tunnel protocol request 47 (for GRE tunneling) 94 (for IP within IP tunneling) 17 (for UDP tunneling) 6 (for TCP tunneling) |

Upon receiving the IPCP Configure-Request message with the 'A-P tunnel request option', the PDSN 22 sets up a temporary tunnel to the AR 42 by setting a lifetime value to a small value in step 1010, if it can accept the 'A-P tunnel request option'. After successfully setting up the temporary tunnel, the PDSN 22 transmits an IPCP Configure-Ack message to the AT 10 in response to the IPCP Configure-Request message in step 1011. However, if the PDSN 22 has options unacceptable for the request of the AT 10, it transmits an IPCP Configure-Nak message with the corresponding options to the AT 10 rather than setting up the temporary tunnel.

After setting up the temporary tunnel, the AT 10 performs the following process.

In step 1012, the AT 10 determines the time when the handoff from the wireless LAN to the mobile communication network is completed. That is, the AT 10 detects its movement from the wireless LAN to the mobile communication network. Thereafter, in step 1013, the AT 10 transmits an IPCP Configure-Request message with an 'A-P tunnel request option' in order to inform the PDSN 22 of the completion of the handoff. In this case, the AT 10 sets a TTT flag in the 'A-P tunnel request option' to '0' in order to update a regular tunnel from the PDSN 22 to the AR 42. Upon receiving the IPCP Configure-Request message with the 'A-P tunnel request option', the PDSN 22 updates a regular A-P tunnel to the AR 42 in step 1014. As a result, the AR 42 delivers IP packets via the mobile communication network using the regular tunnel, instead of delivering the IP packets via the wireless LAN.

After updating the regular tunnel, the PDSN 22 transmits an IPCP Configure-Ack message to the AT 10 in response to the IPCP Configure-Request message in step 1015.

After the regular tunnel is set up between the PDSN 22 and the AR 42, if the AT 10 no longer exchanges IP packets or is powered off, the AT 10 performs a PPP release process with the PDSN 22. Thereafter, the PDSN 22 releases the tunnel to the AR 42. This is equal to the tunnel release process described with reference to FIG. 7.

The embodiments of the present invention can solve the problems of the conventional method that do not use Mobile IP, in which because a new IP address is allocated each time an AT moves from a wireless LAN to a mobile communication network, the AT cannot maintain upper layer sessions and cannot deliver packets using the existing IP address.

Alternatively, the embodiments of the present invention can also be applied to a handoff from a mobile communication network to a wireless LAN. In this case, because the AT maintains the existing IP address during the handoff, it can maintain upper layer sessions and reduce the loss of packets.

Unlike the conventional method in which an AT should support Mobile IP to support inter-network handoff, the embodiments of the present invention can support inter-network mobility regardless of whether the AT supports Mobile IP.

In addition, IP tunneling is dispersed over a PDSN through an AR in order to solve the problem that IP tunneling for delivering IP packets to a network where the AT is located is concentrated in an HA.

While the invention has been shown and described with reference to exemplary embodiments thereof, it will be understood by those skilled in the art that various changes in form and details may be made therein without departing from the spirit and scope of the invention as defined by the appended claims.

What is claimed is:

1. A method for performing a handoff between a wireless local area network (LAN) comprising an access router (AR) supporting an Internet protocol (IP) routing function and a mobile communication network comprising a packet data service node (PDSN) connected to a base station system (BSS) for supporting the IP routing function, the method comprising the steps of:
   detecting, by an access terminal (AT), its movement from the wireless LAN to the mobile communication network;
   exchanging, between the AT and the PDSN, information for tunneling between the AR and the PDSN;
   establishing by the PDSN, a tunnel for packet delivery between the PDSN and the AR; and
   delivering packets to the AT through the tunnel,
   wherein the information for tunneling between the AR and the PDSN includes the tunneling information delivered from the PDSN to the AT comprising a serving PDSN IP address, and a PDSN IP address used for a tunnel between the PDSN and the AR.

2. The method of claim 1, wherein the tunneling information delivered from the AT to the PDSN comprises an existing IP address used in the wireless LAN by the AT.

3. The method of claim 1, wherein the tunneling information is delivered through an exchange of an Internet protocol control protocol (IPCP) message between the AT and the PDSN.

4. The method of claim 2, wherein the tunneling information is delivered through an exchange of an Internet protocol control protocol (IPCP) message between the AT and the PDSN, and the IPCP message comprises a field for requesting establishment of a tunnel from the PDSN to the AR.

5. The method of claim 1, further comprising the steps of:
   establishing a tunnel for packet delivery from the PDSN to the AR; and
   delivering packets delivered from the AT to a correspondent node (CN) connected to an external IP network via the tunnel.

6. The method of claim 1, further comprising the step of:
   releasing the tunnel through an exchange of an Internet protocol control protocol (IPCP) message with the PDSN if the AT no longer receives packets after the tunnel is set up.

7. A wireless communication system for performing handoff of an access terminal (AT) between a wireless local area network (LAN) comprising an access router (AR) supporting an Internet protocol (IP) routing function and a mobile communication network comprising a packet data service node (PDSN) connected to a base station system (BSS) for supporting the IP routing function, the system comprising:
   the AT having a dual-mode function capable of accessing both the wireless LAN and the mobile communication network, for exchanging information for tunneling between the AR and the PDSN with the PDSN, when the AT moves from the wireless LAN to the mobile communication network; and
   the PDSN for receiving the tunneling information from the AT, establishing a tunnel for packet delivery with the AR according to the received tunneling information, and delivering packets to the AT via the tunnel,
   wherein the information for tunneling between the AR and the PDSN includes the tunneling information delivered from the PDSN to the AT comprising a serving PDSN IP address, and a PDSN IP address used for a tunnel between the PDSN and the AR.

8. The wireless communication system of claim 7, wherein the tunneling information delivered from the AT to the PDSN comprises an existing IP address used by the AT in the wireless LAN.

9. The wireless communication system of claim 7, wherein the tunneling information is delivered through an exchange of an Internet protocol control protocol (IPCP) message between the AT and the PDSN.

10. The wireless communication system of claim 8, wherein the AT delivers the tunneling information to the PDSN through an exchange of an Internet protocol control protocol (IPCP) message with the PDSN, and the IPCP message comprises a field for requesting establishment of a tunnel from the PDSN to the AR.

11. A method for performing a handoff between a wireless local area network (LAN) comprising an access router (AR) supporting an Internet protocol (IP) routing function and a mobile communication network comprising a packet data service node (PDSN) connected to a base station system (BSS) for supporting the IP routing function, the method comprising the steps of:

exchanging, by an access terminal (AT), information for performing temporary tunneling between the PDSN and the AR, with the PDSN;

establishing, by the PDSN, a temporary tunnel for packet delivery between the PDSN and the AR;

after completion of the handoff, updating, by the PDSN, the temporary tunnel between the PDSN and the AR as a primary tunnel; and delivering, by the PDSN, packets to the AT via the updated primary tunnel, wherein the information for tunneling between the AR and the PDSN includes the tunneling information delivered from the PDSN to the AT comprising a serving PDSN IP address, and a PDSN IP address used for a tunnel between the PDSN and the AR.

12. The method of claim 11, wherein the temporary tunneling information delivered from the AT to the PDSN comprises an existing IP address used by the AT in the wireless LAN.

13. A method for performing a handoff by an access terminal (AT) that moves between a wireless local area network (LAN) comprising an access router (AR) supporting an Internet protocol (IP) routing function and a mobile communication network comprising a packet data service node (PDSN) for supporting the IP routing function, the method comprising the steps of:

detecting movement of the AT from the wireless LAN to the mobile communication network;

exchanging information for tunneling between the PDSN and the AR, with the PDSN; and if a tunnel for packet delivery between the PDSN and the AR is established, receiving packets via the set tunnel, wherein the information for tunneling between the AR and the PDSN includes the tunneling information delivered from the PDSN to the AT comprising a serving PDSN IP address, and a PDSN IP address used for a tunnel between the PDSN and the AR.

14. The method of claim 13, wherein the tunneling information delivered to the PDSN comprises an existing IP address used by the AT in the wireless LAN.

15. The method of claim 14, wherein the tunneling information is delivered to the PDSN through an exchange of an Internet protocol control protocol (IPCP) message with the PDSN, and the IPCP message comprises a field for requesting establishment of a tunnel from the PDSN to the AR.

16. The method of claim 13, further comprising the steps of:

establishing a tunnel for packet delivery from the PDSN to the AR; and delivering packets to a correspondent node (CN) connected to an external IP network via the set tunnel.

17. A method for performing a handoff between an access terminal (AT) that moves from a wireless local area network (LAN) comprising an access router (AR) supporting an Internet protocol (IP) routing function, to a mobile communication network comprising a packet data service node (PDSN) for supporting the IP routing function, the method comprising the steps of:

exchanging information for temporary tunneling between the PDSN and the AR, with the PDSN;

if a temporary tunnel for packet delivery between the PDSN and the AR is established, sending a primary tunnel update request to the PDSN after completion of the handoff to the mobile communication network; and if the temporary tunnel for packet delivery between the PDSN and the AR is updated as a primary tunnel, receiving packets via the updated regular tunnel, wherein the information for tunneling between the AR and the PDSN includes the tunneling information delivered from the PDSN to the AT comprising a serving PDSN IP address, and a PDSN IP address used for a tunnel between the PDSN and the AR.

18. The method of claim 17, wherein the temporary tunneling information delivered from the AT to the PDSN comprises an existing IP address used by the AT in the wireless LAN.

19. The method of claim 17, further comprising the step of:

if a regular tunnel for packet delivery from the PDSN to the AR is updated, delivering packets to a correspondent node (CN) connected to an external W network via the updated primary tunnel.

\* \* \* \* \*

UNITED STATES PATENT AND TRADEMARK OFFICE
CERTIFICATE OF CORRECTION

PATENT NO. : 7,586,876 B2
APPLICATION NO. : 11/212767
DATED : September 8, 2009
INVENTOR(S) : Chung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 881 days.

Signed and Sealed this

Twenty-first Day of September, 2010

David J. Kappos
*Director of the United States Patent and Trademark Office*